Patented Dec. 9, 1947

2,432,356

UNITED STATES PATENT OFFICE 2,432,356

PREPARATION OF SUBSTITUTED PHENOLS BY REACTION OF PHENOL WITH STYRENE

James W. Underwood, Pittsfield, Mass., assignor to General Electric Company, a corporation of New York No Drawing. Application March 21, 1945, Serial No. 584,036

12 Claims. (Cl. 260—619)

This invention relates to new and useful improvements in the art of preparing substituted phenols. More particularly the invention is concerned with the improved process which comprises effecting reaction between phenol and styrene while admixed with (1) a mono-(alpha-phenylethyl) phenol selected from the class consisting of ortho-(alpha-phenylethyl) phenol and para-(alpha-phenylethyl) phenol and (2) sulfuric acid. Specifically the invention relates to technique for increasing the yield of ortho-(alpha-phenylethyl) phenol or of para-(alpha-phenylethyl) phenol in the process of preparing condensation products of phenol and styrene using sulfuric acid as a condensation catalyst, which technique comprises incorporating para- or ortho-(alpha-phenylethyl) phenol into the reaction mixture and heating the mixture of phenol, styrene, para-(alpha-phenylethyl) phenol [or ortho-(alpha-phenylethyl) phenol] and sulfuric acid to effect condensation between the phenol and styrene and to increase the yield of ortho-(alpha-phenylethyl) phenol [or para-(alpha phenylethyl) phenol].

Alpha-phenylethyl phenols are obtained, for example, by condensing phenol with styrene while admixed with a condensation catalyst, e. g., a mineral acid such, for instance, as sulfuric acid, nitric acid, hydrochloric acid, phosphoric acid, etc., and isolating the alpha-phenylethyl phenols from the reaction mass, e. g., by distillation. The products of the reaction include, for example, mono-(alpha-phenylethyl) phenols, e. g., ortho-(alpha-phenylethyl) phenol and para-(alpha-phenylethyl) phenol, as well as di-(alpha-phenylethyl) phenols, tri-(alpha-phenylethyl) phenols and tarry matter of a complex nature.

In some cases it is desirable to obtain greater yields of a particular mono-(alpha-phenylethyl) phenol than normally results from the condensation of phenol and styrene. For instance, at present, phenol substituted in the para position with an alpha-phenylethyl grouping has greater commercial utility, e. g., in the field of oil-soluble resin manufacture, and therefore is a more desirable and valuable product than ortho-(alpha-phenylethyl) phenol.

It is a primary object of my invention to provide an effective and economical method of effecting reaction between phenol and styrene so that greater yields of either ortho-(alpha-phenylethyl) phenol or para-(alpha-phenylethyl) phenol, as may be desired, are obtained.

Briefly described, my method comprises effecting reaction, preferably under heat, between phenol and styrene while admixed with sulfuric acid (concentrated sulfuric acid) and either ortho- or para-(alpha-phenylethyl) phenol thereby to effect condensation between the phenol and styrene and to increase the yield of the other mono-(alpha-phenylethyl) phenol isomer, namely, para- or ortho-(alpha-phenylethyl) phenol. Preferably the mixture is heated until the reaction mass contains ortho-(alpha-phenylethyl) phenol and para-(alpha-phenylethyl) phenol in substantially an equilibrium ratio. Only a small amount of concentrated sulfuric acid is necessary for obtaining the desired results. This method differs from the process disclosed and claimed in copending application Serial No. 584,037 of Kenneth B. Goldblum, filed concurrently herewith and assigned to the same assignee as the present invention, in that the desired ortho- or para-(alpha-phenylethyl) phenol results for the most part, especially when the preferred ratios of ingredients are used, from the phenol-styrene reaction rather than from the conversion of one mono-(alpha-phenylethyl) phenol to the other.

Although such catalysts as Friedel-Crafts-type catalysts, e. g., aluminum chloride, boron trifluoride, etc., exercise some influence in effecting the desired condensation reaction between phenol and styrene, such catalysts are not satisfactory in my process since their use results in a decreased yield of the desired product due to undesirable side reactions and excessive cracking during the distillation process. Mineral acids, as a class, although suitable for condensing phenol and styrene to yield ortho- and para-(alpha-phenylethyl) phenols, as well as other phenylethyl phenols, were found to be unsuitable in increasing the yield of the desired mono-(alpha-phenylethyl) phenol from the reaction of phenol, styrene and the ortho or para isomer of the desired mono-(alpha-phenylethyl) phenol. Sulfuric acid alone was found to have the unique property of increasing the yield of the desired mono-(alpha-phenylethyl) phenol from the aforementioned ingredients.

The use of phenol in molecular excess of that required for reaction with the styrene is preferred, since this increases the yield of the desired mono-(alpha-phenylethyl) phenol, for example by retarding the formation of undesirable products of the reaction such, for instance, as polyphenyl phenols, poly-(alpha-phenylethyl) phenols, tars, etc. The amount of excess phenol, which apparently functions as a diluent, may be varied widely depending, for example, upon the amount of sulfuric acid used and the time and temperature of reaction. Thus I may employ, for instance, styrene and phenol in the ratio of one mol of the former to more than one mol, more particularly from about 1.5 to about 7 mols or more, of the latter. The excess phenol is not essential in carrying my invention into effect, and other ratios, for example equimolecular proportions of phenol and styrene, may be employed if desired. However, the use of a molecular excess of phenol is advantageous for the reasons aforementioned. If desired, the phenol may be only slightly in excess, for instance 1.05 mols phenol per mol styrene, or the phenol may be substantially in excess as above set forth.

The amount of the mono-(alpha-phenylethyl) phenol employed may be varied depending, for example, upon the amounts of phenol and styrene used. I prefer that the ratio by weight of the mono-(alpha-phenylethyl) phenol to the phenol and styrene be approximately 4:6:6 if ortho-(alpha-phenylethyl) phenol is employed and a ratio of approximately 6:4:4 if para-(alpha-phenylethyl) phenol is used. No particular advantage ordinarily accrues if the amount of the mono-(alpha-phenylethyl) phenol exceeds substantially that called for by these ratios. Any material excess of mono-(alpha-phenylethyl) phenol that is used, over and above that specified in the aforementioned ratios, is converted by the sulfuric acid to the equilibrium ratio of ortho- and para-(alpha-phenylethyl) phenols more fully described in copending application Serial No. 584,037 of Kenneth B. Goldblum. The phenol specified in the foregoing ratios is exclusive of the molecular excess of phenol that is used for the purpose of retarding tar formation, etc.

The amount of sulfuric acid (concentrated sulfuric acid) may be varied over a wide range depending, for instance, upon the rapidity with which it is desired to effect the condensation. Generally, the amount of sulfuric acid will not exceed substantially 5 per cent by weight of the other ingredients. More particularly, the amount of concentrated sulfuric acid, e. g., acid containing about 90 to 96 per cent $H_2SO_4$, will not exceed substantially 5 per cent by weight of the total weight of phenol, styrene and ortho- or para-(alpha-phenylethyl) phenol employed, and may be considerably less, for example as little as about 0.2 per cent by weight thereof. Good results have been obtained using from about 0.5 to about 2.5 per cent by weight (of the other ingredients) of concentrated sulfuric acid. When the sulfuric acid is employed in an amount much above about 5 per cent by weight of the other ingredients, an objectionable amount of tarry material tends to be produced with a consequent decrease in the yield of the desired mono-(alpha-phenylethyl) phenol.

The reaction between the phenol and styrene while admixed with a small amount of sulfuric acid and ortho- or para-(alpha-phenylethyl) phenol may be carried out under a variety of temperature and pressure conditions, for example at normal (20° to 30° C.) or elevated temperature and at atmospheric, subatmospheric or superatmospheric pressure. Preferably the reaction is effected at a temperature within the range of 120° to 200° C. at atmospheric or substantially atmospheric pressure. Higher temperatures favor the formation of less desirable products, such as tars, etc.

The time required for effecting the desired reaction likewise varies widely depending, for instance, upon the temperature at which the reaction is effected and the amount of sulfuric acid used. Ordinarily a satisfactory condensation will be effected in from about ¼ to 10 or 12 hours. Under optimum conditions with regard to temperature and the amount of sulfuric acid employed, I have found that a period of the order of 2 to 6 hours is most suitable. Increasing the time of reaction increases the yield of the desired mono-(alpha-phenylethyl) phenol, other conditions being the same, up to the point at which the reaction reaches a state of equilibrium. Any further increase in the period of the reaction generally results in an increase in the amount of tarry matter and thus reduces the amount of the desired mono-(alpha-phenylethyl) phenol in the reaction mass, although the ratio of ortho-(alpha-phenylethyl) phenol to para-(alpha-phenylethyl) phenol in the said mass remains substantially the same.

The reaction may be carried out in one or more stages or steps. A preferred method comprises first adding the styrene slowly to the mixture of the other ingredients over a prolonged period. The mixed ingredients to which the styrene is added may or may not be heated, as desired or as conditions may require, but preferably the mixture is heated. When the mixture is heated to a temperature of, for example, 120° to 200° C., the addition of the styrene may extend over a period of, for instance, from 1 to 4 hours. The second step consists in effecting further reaction between the reactants, preferably under heat, for example by heating the mixture after the addition of all of the styrene at 120° to 200° C. until the reaction mass contains ortho-(alpha-phenylethyl) phenol and para-(alpha-phenylethyl) phenol in substantially an equilibrium ratio. This two-step method materially decreases the amount of tar that usually forms when all of the styrene is added at once to the mixture of the other ingredients and reaction is effected therebetween.

Under optimum conditions of temperature, reaction time and catalyst concentration, the reaction mass contains ortho-(alpha-phenylethyl) phenol and para-(alpha-phenylethyl) phenol in the ratio of, by weight, approximately 2 parts of the former to 3 parts of the latter, together with small amounts of poly-(alpha-phenylethyl) phenols, tarry matter, etc. The ortho- and para-(alpha-phenylethyl) phenols and other phenols are separated from the reaction mass, for example by distillation through a packed column. If the ortho- and para-(alpha-phenylethyl) phenols are first separated from the reaction mass as a single fraction containing a mixture of these two isomers, then this fraction may be redistilled, if desired, to separate the one isomer from the other. By adding, that is, recycling, the undesired mono-alpha-phenylethyl) phenol to new reaction masses containing phenol, styrene and sulfuric acid, even greater yields of the desired mono-(alpha-phenylethyl) phenol may be obtained.

At the end of the reaction period it is advantageous to treat the reaction mass to remove the sulfuric acid. This may be done, for instance, by washing the mass with water containing a neutralizing agent, e. g., a hydroxide, carbonate or bicarbonate of magnesium or of the alkali or alkaline-earth metals, more specific examples of which are sodium carbonate, sodium hydroxide, sodium bicarbonate, calcium hydroxide, etc. Unless the sulfuric acid be neutralized, charring of the organic components of the mass may occur when distilling the mass to isolate the products of the reaction, including the ortho- and para-(alpha-phenylethyl) phenols, and the diluent or unreacted phenol, if any, that may be present. Solid impurities or contaminants, for example the salt formed when the acid is neutralized, unreacted alkaline material, etc., preferably are removed, for instance by filtration, prior to the distillation step.

In order that those skilled in the art better may understand how my invention may be practiced, the following examples are given by way of illustration and not be way of limitation. The sulfuric acid was concentrated sulfuric acid (approximately 96% $H_2SO_4$, about 1.84 specific gravity). In each example the amount of sulfuric acid employed was approximately 1 per cent by weight of the other ingredients. The ortho-(alpha-phenylethyl) phenol boiled within the range of 300°–302° C. at 742 mm. pressure, while the para-(alpha-phenylethyl) phenol used in Example 9 boiled within the range of 315°–316° C. at 742.2 mm.

The procedure was substantially the same in all examples. All of the ingredients with the exception of the styrene were mixed together in a three-necked, round-bottomed flask equipped with a reflux condenser, a mercury-sealed mechanical stirrer and a thermometer. The mixture was heated, with stirring, to the reflux temperature of the mass (about 168°–176° C.). In all the examples with the exception of Example 8, where the time of adding the styrene was 1½ hours, the styrene was added slowly to the heated mixture of the other ingredients through a dropping funnel over a period of 3 hours, while maintaining the mixed ingredients at a temperature of about 168°–178° C. After adding all the styrene the reaction mixture was heated at about 170°–179° C. for an additional period so that the total elapsed period from the time when the styrene was first added to the end of the final heating was approximately 4 hours. The reaction mass was cooled to about 65° C., after which an excess of sodium carbonate in a small amount of water was added to neutralize the sulfuric acid. The mixture of sodium sulfate and unreacted sodium carbonate that precipitated was removed by filtration. The filtrate was distilled, using a flask provided with a packed column 1 inch in diameter and 8 inches long. The fraction boiling within the range of 210°–230° C. at about 50 mm. pressure contained the ortho- and para-(alpha-phenylethyl) phenols. This fraction was analyzed to determine the per cent by weight of the two isomers present therein.

The amounts and mol ratios of phenol, styrene and ortho-(alpha-phenylethyl) phenol employed in Examples 1 to 8, inclusive, are shown in Table I, while the results obtained are shown in Table II. In Table II the heading "percent phenol recovered" refers to the phenol fraction obtained by fractional distillation of the reaction mass. It is expressed as per cent by weight of phenol recovered from the phenol used over and above that theoretically required to react with the styrene (1 mol phenol to 1 mol styrene) to yield mainly mono-(alpha-phenylethyl) phenols. The heading "percent tars" refers to the tars and "high boilers" in the residue remaining after distilling off the fraction containing the mono-(alpha-phenylethyl) phenols. These "tars" are expressed as per cent by weight of the total theoretical amount of mono-(alpha-phenylethyl) phenols obtainable.

Table I

| Example Number | Styrene | | Phenol | | Ortho-(alpha-phenylethyl) Phenol | |
|---|---|---|---|---|---|---|
| | Parts | Approx. Mol Ratio | Parts | Approx. Mol Ratio | Parts | Approx. Mol Ratio |
| 1 | 104.1 | 1 | 94.1 | 1 | 0 | |
| 2 | 104.1 | 1 | 94.1 | 1 | 132.0 | 0.67 |
| 3 | 104.1 | 1 | 376.4 | 4 | 0 | |
| 4 | 104.1 | 1 | 376.4 | 4 | 39.6 | 0.20 |
| 5 | 104.1 | 1 | 376.4 | 4 | 79.2 | 0.40 |
| 6 | 104.1 | 1 | 376.4 | 4 | 118.8 | 0.60 |
| 7 | 104.1 | 1 | 564.6 | 6 | 132.0 | 0.67 |
| 8 | 104.1 | 1 | 626.0 | 6.67 | 132.0 | 0.67 |

Table II

| Example Number | Per Cent Phenol Recovered | Ortho- and Para-(alpha-phenylethyl) Phenol Fraction [1] | | | | | Per Cent Tars |
|---|---|---|---|---|---|---|---|
| | | Parts Obtained | Mols Para Isomer Obtained | Approx. Per Cent Para Isomer in Fraction | Approx. Per Cent Ortho Isomer in Fraction | Yield of Ortho and Para Isomers Expressed as Per Cent of Theoretical | |
| 1 | (2) | 83 | [3] 0.25 | 60 | 40 | 42.0 | 39.0 |
| 2 | (2) | 174 | 0.53 | 60 | 40 | 53.0 | 34.0 |
| 3 | 87 | 159 | 0.48 | 59 | 41 | 80.5 | 16.2 |
| 4 | 96 | 207 | 0.67 | 63 | 37 | 87.6 | 11.0 |
| 5 | 97 | 242 | 0.74 | 61 | 39 | 87.2 | 10.5 |
| 6 | 96 | 258 | 0.81 | 62 | 38 | 81.0 | 15.2 |
| 7 | 92 | 267 | 0.85 | 62 | 38 | 81.4 | 14.6 |
| 8 | 95 | 289 | 0.88 | 60 | 40 | 87.4 | 11.0 |

[1] This fraction is redistilled to separate the ortho-(alpha-phenylethyl) phenol from the para isomer.
[2] A small amount of unreacted phenol was recovered.
[3] In addition to 0.25 mol para-(alpha-phenylethyl) phenol there also was obtained 0.17 mol ortho-(alpha-phenylethyl) phenol.

*Example 9*

This example illustrates the increased yield of ortho-(alpha-phenylethyl) phenol obtained when para-(alpha-phenylethyl) phenol is a component of the reaction mass in addition to phenol, styrene and concentrated sulfuric acid.

| | Parts | Approx. Mol Ratio |
|---|---|---|
| Phenol | 94.1 | 1 |
| Styrene | 104.1 | 1 |
| Para-(alpha-phenylethyl) phenol | 297.0 | 1.5 |
| Concentrated sulfuric acid | 4.95 | |

The styrene was added to a stirred mixture of the other ingredients over a period of 3 hours at a mixture temperature of 171°–176° C. in the same manner as was done in the prior examples. The reaction mass was then heated for an additional hour at 173°–177° C. The procedure for isolating the fraction containing the ortho- and para-(alpha-phenylethyl) phenols was the same as that used in the previous examples. Analysis of this fraction, which comprised 280 parts by weight of ortho- and para-(alpha-phenylethyl) phenols, showed that approximately 62 per cent by weight was the para isomer and about 38 per cent by weight was the ortho isomer. The total yield of ortho- and para-(alpha-phenylethyl) phenols expressed as per cent by weight of the theoretical yield was 51 per cent, while the yield of tars and "high boilers" expressed as per cent by weight of the total theoretical amount of mono-(alpha-phenylethyl) phenols obtainable was 39 per cent. Whereas in Example 1, one mol styrene upon reaction with one mol phenol yielded 0.17 mol ortho-(alpha-phenylethyl) phenol, the addition of para-(alpha-phenylethyl) phenol with the other reactants resulted in a yield of about 0.52 mol ortho-(alpha-phenylethyl) phenol, that is, about three times as much.

What I claim as new and desire to secure by Letters Patent of the United States is:

1. The process which comprises incorporating a mono-(alpha-phenylethyl) phenol selected from the class consisting of ortho-(alpha-phenylethyl) phenol and para-(alpha-phenylethyl) phenol into a reaction mixture of phenol, styrene, and sulfuric acid, and effecting reaction of said mixture.

2. In the process of preparing condensation products of phenol and styrene using sulfuric acid as a condensation catalyst, the method of increasing the yield of ortho-(alpha-phenylethyl) phenol which comprises incorporating para-(alpha-phenylethyl) phenol into the reaction mixture and heating the mixture of phenol, styrene, para-(alpha-phenylethyl) phenol and sulfuric acid to effect condensation between the phenol and styrene and to increase the yield of ortho-(alpha-phenylethyl) phenol.

3. In the process of preparing condensation products of phenol and styrene using sulfuric acid as a condensation catalyst, the method of increasing the yield of para-(alpha-phenylethyl) phenol which comprises incorporating ortho-(alpha-phenylethyl phenol) into the reaction mixture and heating the mixture of phenol, styrene, ortho-(alpha-phenylethyl) phenol and sulfuric acid to effect condensation between the phenol and styrene and to increase the yield of para-(alpha-phenylethyl) phenol.

4. The process which comprises incorporating ortho-(alpha-phenylethyl) phenol into a mixture containing (1) phenol, (2) styrene, and (3) a small amount of sulfuric acid, and heating said mixture until the reaction mass contains ortho-(alpha-phenylethyl) phenol and para-(alpha-phenylethyl) phenol in substantially an equilibrium ratio.

5. The process which comprises incorporating para-(alpha-phenylethyl) phenol into a mixture containing (1) phenol, (2) styrene, (3) a small amount of sulfuric acid, and heating said mixture until the reaction mass contains ortho-(alpha phenylethyl) phenol and para-(alpha-phenylethyl) phenol in substantially an equilibrium ratio.

6. The process which comprises incorporating a mono-(alpha-phenylethyl) phenol selected from the class consisting of ortho-(alpha-phenylethyl) phenol and para-(alpha phenylethyl) phenol into a mixture of styrene, phenol and a small amount of sulfuric acid, the ratio of styrene to phenol being one mol of the former to more than one mol of the latter, and effecting reaction of said mixture under heat.

7. The process which comprises incorporating ortho-(alpha-phenylethyl) phenol into a mxture of (1) phenol, (2) styrene, and (3) a small amount of sulfuric acid, heating the resulting mixture until the reaction mass contains ortho-(alpha-phenylethyl) phenol and para-(alpha-phenylethyl) phenol in substantialliy an equilibrium ratio, neutralizing the acid reaction mass, and isolating para-(alpha-phenylethyl) phenol and other phenols from the neutralized mass.

8. The process which comprises incorporating ortho-(alpha-phenylethyl) phenol into a reaction mixture containing (1) phenol, (2) styrene, and (3) a small amount of sulfuric acid, heating the resulting mixture at a temperature within the range of 120° to 200° C. until the reaction mass contains ortho-(alpha-phenylethyl) phenol and para-(alpha-phenylethyl) phenol in substantially an equilibrium ratio, neutralizing the acid reaction mass, and separating para-(alpha-phenylethyl) phenol and other phenols from the neutralized mass by distillation.

9. The process which comprises incorporating ortho-(alpha-phenylethyl) phenol into a mixture of styrene, phenol, and sulfuric acid, the ratio of styrene to phenol being one mol of the former to more than one mol of the latter, effecting reaction of the resulting mixture under heat until the reaction mass contains ortho-(alpha-phenylethyl) phenol and para-(alpha-phenylethyl) phenol in substantially an equilibrium ratio, neutralizing the acid reaction mass, and separating para-(alpha-phenylethyl) phenol and other phenols from the neutralized mass by distillation.

10. The process which comprising incorporating ortho-(alpha-phenylethyl) phenol into a mixture of styrene, phenol, and sulfuric acid in an amount corresponding to from about 0.2 to about 5 per cent by weight of the other ingredients, the ratio of styrene to phenol being one mol of the former to from about 1.5 to about 7 mols of the latter, reacting the resulting mixture under heat until the reaction mass contains ortho-(alpha-phenylethyl) phenol and para-(alpha-phenylethyl) phenol in substantially an equilibrium ratio, neutralizing the acid reaction mass, and distilling the neutralized mass to separate para-(alpha-phenylethyl) phenol and other phenols therefrom.

11. The method which comprises heating a mixture of (1) phenol, (2) ortho-(alpha-phenylethyl) phenol and (3) concentrated sulfuric acid in an amount corresponding to from 0.2 to 5 per cent by weight of the phenols of (1) and (2) at a temperature within the range of 120° to 200° C. while slowly adding styrene to the heated mixture, continuing to heat the mixture after the addition of all of the styrene at 120° to 200° C. until the reaction mass contains ortho-(alpha-phenylethyl) phenol and para-(alpha-phenylethyl) phenol in substantially an equilibrium ratio, neutralizing the acid reaction mass, filtering the neutralized mass to remove solid impurities, and distilling the filtrate to separate para-(alpha-phenylethyl) phenol and other phenols therefrom.

12. The method which comprises heating a mixture of (1) phenol, (2) ortho-(alpha-phenylethyl) phenol and (3) concentrated sulfuric acid in an amount corresponding to from 0.2 to 5 per cent by weight of the phenols of (1) and (2) at a temperature within the range of 120° to 200° C. while slowly adding styrene to the heated mixture over a period of from 1 to 4 hours, continuing to heat the mixture after the addition of all of the styrene at 120° to 200° C. until the reaction mass contains ortho-(alpha-phenylethyl) phenol and para-(alpha-phenylethyl) phenol in substantially an equilibrium ratio, cooling the acid reaction mass, neutralizing the cooled mass, filtering the neutralized mass to remove solid impurities, and distilling the filtrate to separate para-(alpha-phenylethyl) phenol and other phenols therefrom.

JAMES W. UNDERWOOD.

REFERENCES CITED

The following references are of record in the file of this patent:

UNITED STATES PATENTS

| Number | Name | Date |
| --- | --- | --- |
| 1,932,518 | Hale | Oct. 31, 1933 |
| 2,315,556 | Soday | Apr. 6, 1943 |
| 2,329,671 | Ward | Sept. 14, 1943 |
| 2,394,754 | D'Alelio | Feb. 12, 1946 |